(12) United States Patent
Chinbe et al.

(10) Patent No.: US 10,277,492 B2
(45) Date of Patent: Apr. 30, 2019

(54) MOBILE TERMINAL TEST DEVICE AND METHOD

(71) Applicant: ANRITSU CORPORATION, Kanagawa (JP)

(72) Inventors: Ryota Chinbe, Kanagawa (JP); Nobutoshi Otonari, Kanagawa (JP); Kazunari Kawano, Kanagawa (JP); Akira Hatano, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 72 days.

(21) Appl. No.: 15/478,324

(22) Filed: Apr. 4, 2017

(65) Prior Publication Data
US 2017/0317907 A1   Nov. 2, 2017

(30) Foreign Application Priority Data
Apr. 27, 2016   (JP) ................. 2016-089825

(51) Int. Cl.
*H04L 12/26*   (2006.01)
*H04B 17/345*   (2015.01)
(Continued)

(52) U.S. Cl.
CPC ......... *H04L 43/0888* (2013.01); *H04B 15/00* (2013.01); *H04B 17/29* (2015.01);
(Continued)

(58) Field of Classification Search
CPC ..... H04L 43/0888; H04L 43/50; H04B 17/29; H04B 15/00; H04B 17/345; H04W 24/08; H04W 24/06
See application file for complete search history.

(56) References Cited

U.S. PATENT DOCUMENTS

| 8,008,988 | B1 * | 8/2011 | Yang | H03K 17/693 333/101 |
| 2009/0289846 | A1 * | 11/2009 | Ammann | H04B 1/70752 342/357.27 |

(Continued)

OTHER PUBLICATIONS

3rd Generation Partnership Project; Technical specification 36.521-1; vol. 13.0.1; Jan. 2016.

*Primary Examiner* — Chirag G Shah
*Assistant Examiner* — Joshua Smith
(74) *Attorney, Agent, or Firm* — Pearne & Gordon LLP

(57) ABSTRACT

Downlink signals output from a transmission and reception unit are combined with an interference signal of a CW, a resultant signal is applied to a mobile terminal, throughputs for respective interference signal frequencies for the downlink signals are collectively measured, a signal suppression band of the filter is fitted to a frequency band of the downlink signal determined not to reach a defined value, and re-measurement and re-determination of the throughput for the downlink signal among the collectively measured throughputs are performed. In a case where throughputs collectively measured at a certain interference signal frequency are equal to or greater than the defined value and a case where re-measured throughputs of all the downlink signals are equal to or greater than the defined value, the interference signal frequency is switched to the next interference signal frequency, and collective throughput measurement is performed.

4 Claims, 5 Drawing Sheets

(51) Int. Cl.
*H04B 15/00* (2006.01)
*H04W 24/08* (2009.01)
*H04B 17/29* (2015.01)
*H04W 24/06* (2009.01)

(52) U.S. Cl.
CPC .......... *H04B 17/345* (2015.01); *H04L 43/50* (2013.01); *H04W 24/08* (2013.01); *H04W 24/06* (2013.01)

(56) References Cited

U.S. PATENT DOCUMENTS

| | | | | |
|---|---|---|---|---|
| 2011/0053622 | A1* | 3/2011 | Maruo | H03J 1/00 |
| | | | | 455/501 |
| 2012/0275782 | A1* | 11/2012 | Rapp | H04B 10/272 |
| | | | | 398/25 |
| 2015/0126133 | A1* | 5/2015 | Wang | H04W 24/08 |
| | | | | 455/67.16 |
| 2016/0013874 | A1* | 1/2016 | Bergljung | H04B 17/0085 |
| | | | | 370/252 |

* cited by examiner

MOBILE TERMINAL TEST DEVICE AND METHOD

TECHNICAL FIELD

The present invention relates to a technology for performing a test of a mobile terminal such as a portable phone or a smartphone, and more particularly, to a technology for efficiently performing, with a simple system, measurement of blocking performance in which receiver performance of a downlink signal is degraded due to an influence of interference signals among receiver performances of a mobile terminal with respect to a downlink signal transmitted on a plurality of different carriers from a base station.

BACKGROUND ART

One item of evaluation of receiver performance of a mobile terminal includes out-of-band blocking performance in which receiver performance of a downlink signal is degraded due to an influence of out-of-band interference signals.

In measurement of out-of-band blocking performance, basically, an interference signal of an unmodulated continuous wave (CW) at a predetermined level is combined with a downlink signal to be applied to a mobile terminal, a resultant signal is transmitted to the mobile terminal. An operation of measuring a throughput of the mobile terminal for the downlink signal is performed while changing the level according to a rule while changing the frequency of the interference signal at a predetermined step (for example, 1 MHz step) from an initial value (for example, 1 MHz) to a last value (for example, 12750 MHz) other than a frequency band of the downlink signal (hereinafter referred to as a downlink frequency band), the mobile terminal is regarded to be passed if the throughput is equal to or greater than a defined value at all interference signal frequencies other than the downlink frequency band, and the mobile terminal is regarded to be failed if the throughput does not exceed the defined value at any frequency.

Here, a broadband signal generator that sequentially generates a very broadband range from 1 MHz to 12750 MHz as described above with a determined frequency step and signal level is required as means for generating an interference signal of a CW.

However, an output of such a broadband signal generator includes a spurious component such as harmonics or intermodulation waves due to nonlinearity of an internal amplifying element or the like, in addition to a fundamental wave component that is used as an interference signal.

A level of this spurious component is generally lower than that of the fundamental wave component. However, if the spurious component falls into the downlink frequency band, it is expected that the spurious component influences receiver performance of the mobile terminal.

In order to solve this problem, in the related art, a filter that suppresses a signal component in a downlink frequency band from an output of the signal generator is used, and a signal in which the signal component in the downlink frequency band is suppressed by this filter is regarded as an interference signal, combined with the downlink signal, and applied to the mobile terminal that is a test target.

However, in recent years, a carrier aggregation (hereinafter referred to as "CA") scheme capable of high-speed information transfer by simultaneously using a plurality of downlink signals having different frequency bands has been adopted. When the out-of-band blocking performance is measured for a mobile terminal corresponding to this CA scheme, it is necessary to prepare filters respectively corresponding to the plurality of downlink frequency bands.

Since an arbitrary band allocated in a range from an approximately 800 MHz band to a 3.5 GHz band is likely to be used at present as the downlink frequency band that is used in the CA scheme, frequency variable filters capable of arbitrarily changing a signal suppression band in a range of 800 MHz to 3.5 GHz should be prepared by the number of downlink frequency bands in a case where there are a plurality of downlink frequency bands as described above. There is a problem in that a configuration is complicated and a cost increases.

Further, it is also conceivable that a process of measuring a throughput for each frequency of the interference signal for one of a plurality of downlink frequency bands in a state in which the frequency of the frequency variable filter is fitted to the downlink frequency band with only one frequency variable filter described above, fitting the frequency of the filter to the next downlink frequency band, and then measuring the throughput, is repeated.

A processing procedure thereof will be described with reference to a flowchart of FIG. 5.

First, as a preparation step, a link establishment process is performed so that communication with the mobile terminal can be performed, and transmission power of the test device and the mobile terminal is set (S1).

Then, a variable i for designating an interference signal frequency is initially set to 1, the interference signal frequency Fif(i) is set, a variable j for designating one of a plurality of downlink signals is initially set to 1, and a signal suppression band of the filter is fitted to a frequency band of a j-th downlink signal DLj (S2 to S5).

In this state, a throughput for the j-th downlink signal DLj is measured. When the measurement ends, the variable j for designating the downlink signal is incremented by 1, the processes S5 and S6 are repeated, and throughputs for the all downlink signals are measured (S7 and S8).

Next, it is determined whether or not all of the throughputs of the downlink signals DL1 to DLN sequentially obtained through this measurement are equal to or greater than a defined value R determined by a standard. If all of the throughputs are equal to or greater than the defined value R, a pass determination in which out-of-band blocking performance at this interference signal frequency satisfies a criterion is performed. In a case where any of the measured throughputs does not satisfy the defined value R, a fail determination in which the out-of-band blocking performance at the interference signal frequency does not satisfy the criterion is performed (S9 to S11).

After the pass and fail determination for one interference signal frequency is obtained in this manner, a process of switching the interference signal frequency to the next frequency and executing the processes S3 to S11 is repeated, a determination result or the like is displayed in a step in which the pass and fail determination for the last interference signal frequency is obtained, and the measurement ends (S12 to S14).

A method of measuring a throughput of one of the plurality of downlink frequency bands in a state in which a frequency of a filter is fitted to the downlink signal, using one filter as described above, and then, repeating a process of fitting the frequency of the filter to the next downlink frequency band and measuring the throughput is described in, for example, Non-Patent Document 1.

RELATED ART DOCUMENT

Patent Document

[Non-Patent Document 1] 3GPP TS 36.521-1V13.0.1 (2016-01) TEST CASE 7. 6. 2A. 5

DISCLOSURE OF THE INVENTION

Problem that the Invention is to Solve

However, in the method of sequentially measuring the throughputs of the plurality of downlink signals using one filter as described above, a measurement time of (throughput measurement time required per frequency of interference signals)×(Number N of downlink signals for which throughput measurement is required)×(number of steps M of frequency of interference signal) is required, which is inefficient.

An object of the present invention is to solve this problem and provide a mobile terminal test device and method capable of completing measurement in relatively short time with a simple and inexpensive system configuration.

Means for Solving the Problem

In order to achieve the object, a mobile terminal test device of the present invention includes:

a transmission and reception unit (21) that simultaneously outputs a plurality of downlink signals in different frequency bands for being applied to a mobile terminal of a test target corresponding to a carrier aggregation scheme, and receives an uplink signal output from the mobile terminal;

a signal generator (22) that is capable of switching and outputting an interference signal of a continuous wave (CW) required for measurement of out-of-band blocking performance in a predetermined frequency step over a predetermined frequency range;

a frequency variable filter (23) that receives the interference signal output from the signal generator, suppressing a frequency component overlapping the designated frequency band among the frequency bands of the downlink signal likely to be output from the transmission and reception unit, from frequency components other than a fundamental wave component of the interference signal, and outputting a resultant interference signal; and a signal combination unit (24) for combining the interference signal output from the filter with the plurality of downlink signals output from the transmission and reception unit and applying a combination signal to the mobile terminal, the mobile terminal test device measures the throughputs for respective interference signal frequencies for the plurality of downlink signals of the mobile terminal receiving the combination signal, and further includes:

collective throughput measurement means (31) for measuring the throughputs for respective interference signal frequencies for the plurality of downlink signals of the mobile terminal receiving the combination signal, collectively with respect to the plurality of downlink signals;

throughput determination means (32) for determining whether or not the throughput for each interference signal frequency measured by the collective throughput measurement means is equal to or greater than the defined value;

throughput re-measurement means (33) for performing designation so that a signal suppression band of the filter overlaps the frequency band of a downlink signal determined not to reach the defined value by the throughput determination means when there is the downlink signal, and performing re-measurement of the throughput for the downlink signal;

throughput re-determination means (34) for determining whether or not the throughput re-measured by the throughput re-measurement means is equal to or greater than the defined value; and interference signal frequency switching means (35) for determining that out-of-band blocking performance of all the downlink signals at the interference signal frequency satisfies a criterion in a case where the throughput determination unit determines that the throughputs measured by the collective throughput measurement means are equal to or greater than the defined value at a certain interference signal frequency or a case where the throughput re-determination means determines that throughputs of all the downlink signals re-measured by the throughput re-measurement means are equal to or greater than the defined value, and switching the frequency of the interference signal output from the signal generator to the next interference signal frequency to cause the collective throughput measurement means to perform the throughput measurement.

Further, in the mobile terminal test device of the present invention, the collective throughput measurement means measures the throughputs by monitoring a reception acknowledgement message included in the uplink signal received and demodulated in the transmission and reception unit and counting the reception acknowledgement message for each downlink signal.

Further, a mobile terminal test method of the present invention is a mobile terminal test method of combining a plurality of downlink signals in different frequency bands with an interference signal of a continuous wave (CW) of which a frequency is variable in a predetermined frequency step over a predetermined frequency range required for measurement of out-of-band blocking performance, applying a combination signal to a mobile terminal that is a test target corresponding to a carrier aggregation scheme, and measuring the throughputs for respective interference signal frequencies for the plurality of downlink signals of the mobile terminal receiving the combination signal, and includes a collective throughput measurement step of measuring the throughputs for respective interference signal frequencies for the plurality of downlink signals of the mobile terminal receiving the combination signal, collectively with respect to the plurality of downlink signals;

a throughput determination step of determining whether or not the throughput for each interference signal frequency measured in the collective throughput measurement step is equal to or greater than the defined value;

a throughput re-measurement step of performing re-measurement of the throughput for the downlink signal in a state in which a frequency component overlapping a frequency band of a downlink signal determined not to reach the defined value in the throughput determination step among frequency components of the interference signal is suppressed by a filter when there is the downlink signal;

a throughput re-determination step of determining whether or not the throughput re-measured in the throughput re-measurement step is equal to or greater than the defined value; and an interference signal frequency switching step of determining that out-of-band blocking performance of all the downlink signals at the interference signal frequency satisfies a criterion in a case where it is determined in the throughput determination step that the throughputs collectively measured at a certain interference signal frequency are equal to or greater than the defined value or a case where it is determined in the throughput re-determination step that the throughputs of all the downlink signals re-measured in the throughput re-measurement step are equal to or greater than the defined value, and switching the frequency of the interference signal to the next interference signal frequency to proceed to the collective throughput measurement step.

Further, in the mobile terminal test method of the present invention, the collective throughput measurement step includes measuring the throughputs by monitoring a reception acknowledgement message included in a signal obtained by receiving and demodulating an uplink signal output from the mobile terminal and counting the reception acknowledgement message for each downlink signal.

Advantage of the Invention

Thus, in the present invention, throughput measurements for a plurality of downlink signals with respect to a certain interference signal frequency are collectively performed. If the throughput at this time is equal to or greater than the defined value, the mobile terminal determines that the out-of-band blocking performance satisfies the criterion for the interference signal frequency regardless of presence or absence of a spurious component included in the interference signal, switches the interference signal frequency to the next interference signal frequency, and proceeds to collective measurement of the throughput.

Therefore, if the throughputs collectively measured for all downlink signals at all interference signal frequencies are equal to or greater than the defined value, a collective throughput measurement time per frequency of the interference signal is Ta, and the number of frequency steps is M, the measurement can end with Ta×M in a simple calculation.

This measurement time can be realized by inserting a plurality of filters respectively corresponding to the frequency bands of the plurality of downlink signals into an output line of the interference signal, but the configuration of the system is a large scale and expensive, as described above.

On the other hand, in the present invention, since spurious suppression by a filter is performed only on a downlink signal for which a throughput does not reach a defined value, the spurious suppression can be realized by one filter, and the configuration is simple and inexpensive.

Further, in the present invention, if there is a downlink signal for which the collectively measured throughputs do not satisfy the defined value, re-measurement and re-determination of the throughput for the downlink signal are performed in a state in which a frequency component overlapping the frequency band of the downlink signal has been suppressed from the frequency component of the interference signal by the filter. If the re-measured throughput is equal to or greater than the defined value, a result of the first throughput determination is caused by the spurious component included in the interference signal, and the out-of-band blocking performance of the mobile terminal itself is determined to satisfy the criterion. If the re-measured throughputs for all the downlink signals are equal to or greater than the defined value, the procedure proceeds to collective measurement in the next interference signal frequency.

Accordingly, if the out-of-band blocking performance of the mobile terminal itself is assumed to satisfy a criterion for all the interference signal frequencies, frequencies (the number of times) at which, for example, the spurious component included in the interference signal falls into the frequency bands of three downlink signals and the throughput is smaller than the defined value in a total step number M of the interference signal frequency are $\alpha$, $\beta$, and $\gamma$, respectively, and a throughput measurement time (re-measurement time) for one downlink signal is Tb, the measurement can end with $$Ta \times M + Tb \times (\alpha+\beta+\gamma).$$

In this case, the throughput re-measurement time $Tb \times (\alpha+\beta+\gamma)$ is added to a time $Ta \times M$ required for collective throughput measurement for all interference signal frequencies. However, it is possible to complete the measurement in much shorter time in comparison with a scheme of the related art in which, in a case where one filter is used, a signal suppression band of the filter is fitted to one downlink signal, the throughput is measured, and then, an operation of fitting the signal suppression band of the filter to the next downlink signal and measuring the throughput is repeated.

That is, in the scheme of the related art, if the number of downlink signals is N,
a measurement time of Tb×M×N is required.

If the time Ta required for the collective throughput measurement is substantially the same as a throughput measurement time Tb of one downlink signal, $(\alpha+\beta+\gamma)=M/10$, and N=3, a measurement time in the present invention is, $$Ta \times M + Tb \times (\alpha+\beta+\gamma) = Tb \times M(1+\frac{1}{10}),$$

and is much shorter than a measurement time Tb×M×3 in the scheme of the related art.

Even when the number of re-measurements $(\alpha+\beta+\gamma)$ due to spurious component is every time, $\alpha+\beta+\gamma=M$, and the measurement time is fitted to Tb×M×2 and is ⅔ of the measurement time Tb×M×3 in the scheme of the related art.

BEST MODE FOR CARRYING OUT THE INVENTION

Hereinafter, embodiments of the present invention will be described with reference to the drawings.

Figure 1:
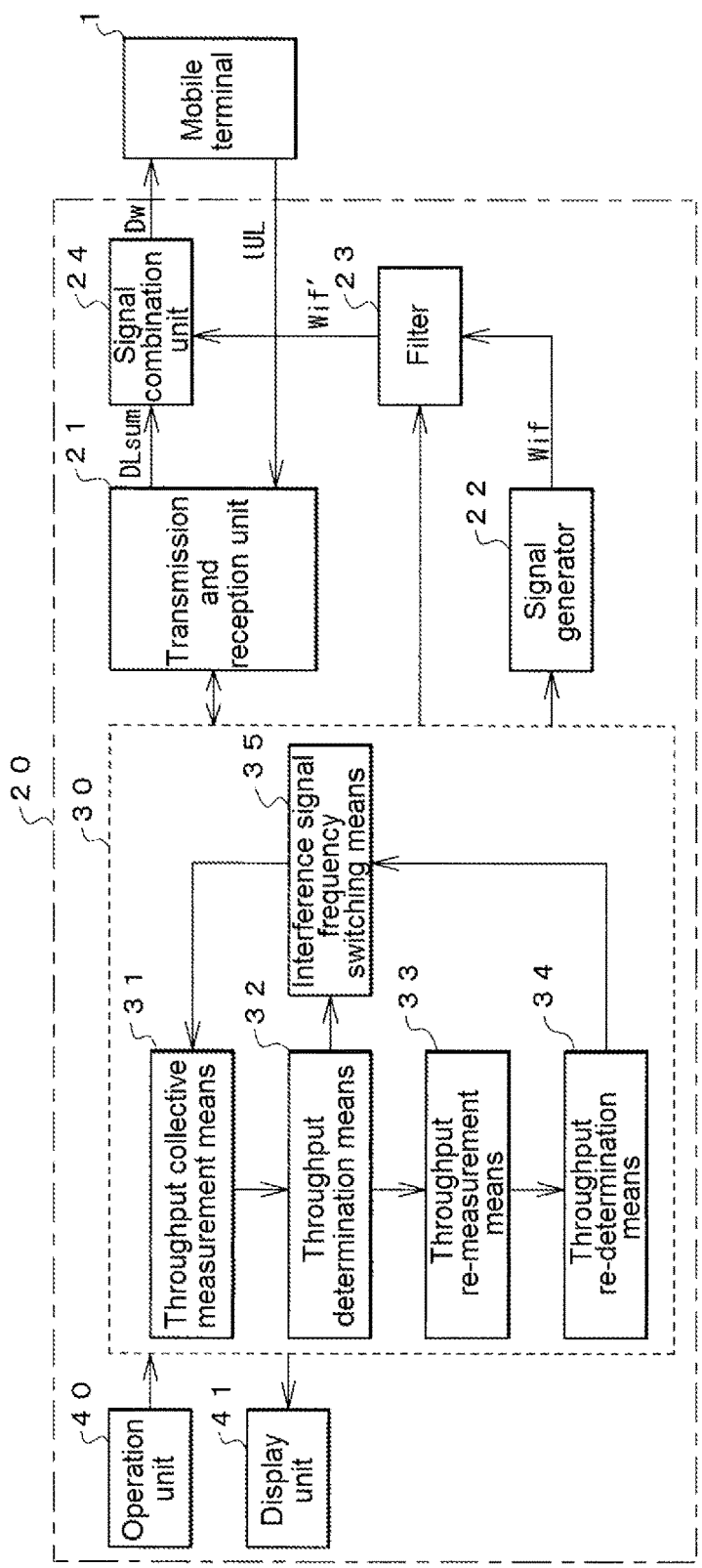
FIG. 1 is a configuration diagram of an embodiment of the present invention.

FIG. 1 illustrates a configuration of a mobile terminal test device (hereinafter simply referred to as a test device) 20 to which the present invention is applied.

The test device 20 includes a transmission and reception unit 21, a signal generator 22, a filter 23, a signal combination unit 24, a test control unit 30, an operation unit 40, and a display unit 41.

The transmission and reception unit 21 performs communication simulating a base station with the mobile terminal 1 that is a test target. Here, the transmission and reception unit 21 outputs a plurality N of downlink signals DL1 to DLN having different frequency bands to be given to the mobile terminal 1 corresponding to a carrier aggregation scheme simultaneously in parallel, and receives an uplink signal UL output from the mobile terminal 1. Here, a downlink combination signal DLsum in which the plurality N of downlink signals DL1 to DLN having different frequency bands are simulatively spatially combined is assumed to be output from the transmission and reception unit 21.

The signal generator 22 generates an interference signal Wif of the CW required for measurement of out-of-band blocking performance for the mobile terminal 1, and can output a frequency Fif (fundamental wave frequency) of the interference signal Wif in a predetermined frequency step (for example, 1 MHz step) over a predetermined frequency range (for example, 1 to 12750 MHz).

For actual measurement of the out-of-band blocking performance, an output level of the interference signal as well as not the frequency is standardized, and the output level is also sequentially changed according to the frequency of the output interference signal.

In a case where a signal in a wide frequency range from 1 MHz to 12 GHz is generated as described above, the signal is generally obtained by mixing (heterodyne of difference) a local signal at a fixed frequency (for example, 15 GHz) equal to or higher than the upper limit frequency with a frequency variable local signal having a variable range (for example, 15 GHz to 27 GHz) that is the same as a variable range of an output frequency at the upper limit frequency or higher.

Therefore, spurious components such as harmonics due to nonlinearity of an amplifying element or intermodulation waves generated at the time of mixing are included in addition to the fundamental wave component of the output signal, and if the spurious component falls into the frequency band of the downlink signal, measurement of the out-of-band blocking performance is likely to be adversely affected.

It is assumed that the filter 23 is a frequency variable filer capable of receiving the interference signal Wif output from the signal generator 22, suppressing a frequency component overlapping the designated frequency band among the frequency bands of the downlink signal likely to be output from the transmission and reception unit 21, from frequency components other than a fundamental wave component of the interference signal Wif, and outputting a resultant interference signal, and a signal suppression band is changed under the control of the test control unit 30.

Here, the filter 23 is a broadband type filter that can cope with a frequency band (800 MHz band to 3.5 GHz band) of any one of downlink signals used for a carrier aggregation scheme, and a configuration thereof is arbitrary.

The signal combination unit 24 combines the interference signal Wif output from the filter 23 with the downlink combination signal DLsum (=DL1 to DLN) output from the transmission and reception unit 21, and applies a combination signal Dw obtained by the combination to the mobile terminal 1.

On the other hand, the uplink signal UL output from the mobile terminal 1 is input to the transmission and reception unit 21 and received and demodulated.

The test control unit 30 includes a computer. The test control unit 30 causes an operator to set information such as items of tests to be performed on the mobile terminal 1 or parameters required for the items through an operation of the operation unit 40 or the like, performs control for the transmission and reception unit 21, the signal generator 22, the filter 23, and the like according to the information, and displays a test result or the like obtained the control on the display unit 41.

A process of the test control unit 30 is variously performed according to a large number of test items, but configuration requirements for executing a test of out-of-band blocking performance will be described herein.

In order to perform a test of out-of-band blocking performance, the test control unit 30 includes collective throughput measurement means 31, throughput determination means 32, throughput re-measurement means 33, throughput re-determination means 34, and interference signal frequency switching means 35.

The collective throughput measurement means 31 collectively measures throughputs $TP1(i)$ to $TPN(i)$ for the respective interference signal frequencies $Fif(i)$ for the plurality N of downlink signals DL1 to DLN of the mobile terminal 1 receiving the combination signal Dw.

Although the number of downlink signals that are throughput measurement targets has been described herein as being equal to the number N of all the downlink signals output from the transmission and reception unit 21, the throughput measurement may be performed in advance on the downlink signal that forms a pair with the uplink signal UL and is mainly used for exchange of control information or the like. Only in a case where there is no problem in the measurement, the throughput measurement for the plurality of other downlink signals may be performed.

Although various methods of measuring the throughput can be considered, it is used herein that a reception acknowledgement message for informing a transmission partner that the mobile terminal 1 has received the downlink signal may be included in the uplink signal UL and replied.

That is, the reception acknowledgement message included in the uplink signal UL that is received and demodulated in the transmission and reception unit 21 is monitored and counted to obtain throughputs $TP1(i)$ to $TPN(i)$ for the respective interference signal frequencies $Fif(i)$ for the downlink signals DL1 to DLN.

For measurement of the throughput, a method of monitoring a signal inside the mobile terminal 1 and obtaining the throughput can be adopted, in addition to the method of obtaining the throughput from the uplink signal UL received and demodulated by the transmission and reception unit 21.

The throughput determination means 32 whether or not the throughputs $TP1(i)$ to $TPN(i)$ for respective interference signal frequencies $Fif(i)$ measured by the collective throughput measurement means 31 are equal to or greater than the defined value R determined in the standard.

When there is the downlink signal DLx determined not to reach the defined value R by the throughput determination means 32, the throughput re-measurement means 33 performs designation so that the signal suppression band of the filter 23 overlaps the frequency band of the downlink signal DLx, and performs re-measurement of the throughput of the downlink signal DLx.

Further, the throughput re-determination means 34 determines whether or not the throughput TPx re-measured by the throughput re-measurement means 33 is equal to or greater than the defined value R.

When the throughput determination means 32 determines that all of the throughputs $TP1(i)$ to $TPN(i)$ collectively measured by the collective throughput measurement means 31 are equal to or greater than the defined value R at a certain interference signal frequency $Fif(i)$ or when the throughput re-determination means 34 determines that all of the throughputs TPx1, TPx2, . . . of the downlink signals DLx 1, DLx 2, . . . re-measured by the throughput re-measurement means 33 are equal to or greater than the defined value R, the interference signal frequency switching means 35 determines that out-of-band blocking performance of all the downlink signals DL1(i) to DLN(i) at the interference signal frequency Fif(i) satisfies the criterion, switches the frequency of the interference signal Wif output from the signal generator 22 to the next interference signal frequency Fif (i+1), and performs the collective throughput measurement.

Figure 2:
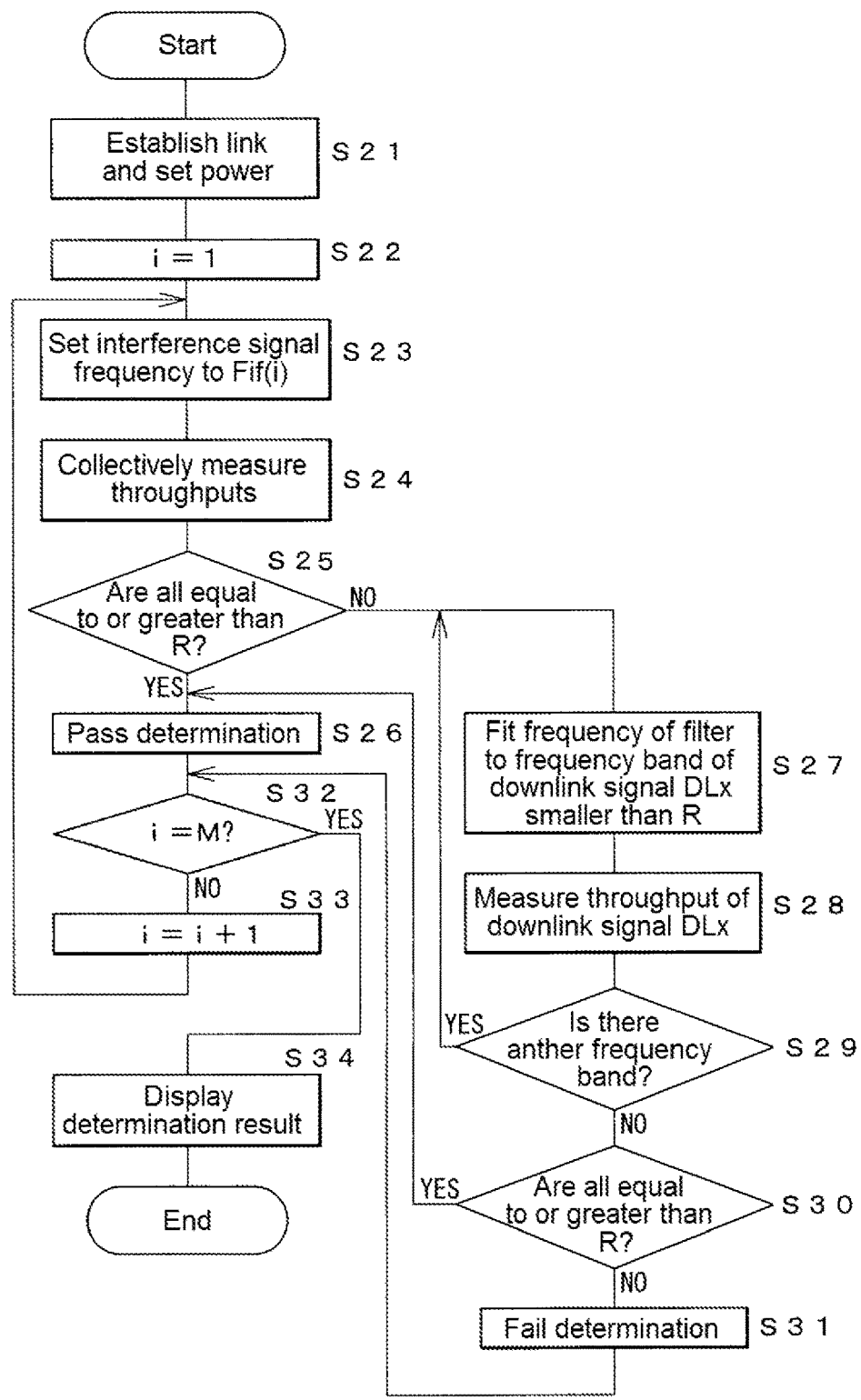
FIG. 2 is a flowchart illustrating a processing procedure of main units of the embodiment of the present invention.

FIG. 2 is a flowchart illustrating an example of a processing procedure of the test control unit 30. Hereinafter, an operation of the test device 20 of the present invention will be described according to this flowchart.

Before start of the test, it is assumed that information such as a frequency band used for communication using a carrier aggregation scheme is set by a testing person in advance.

First, as a preparatory process of the test, a link is established with the mobile terminal 1 using any one of the frequency bands designated by the testing person, and power or the like used for communication is set (S21).

Further, in this preparation step, the filter 23 may have an arbitrary characteristic or may be in a through state as long as the filter can pass a fundamental wave component of the interference signal.

Then, a variable i indicating the number of steps of the interference signal frequency is initially set to 1, and the interference signal frequency is set to Fif(i) (including setting of an output level) (S22 and S23).

Accordingly, the interference signal Wif set to the frequency Fif(i) is combined with the plurality N of downlink signals output from the transmission and reception unit 21, and a combination signal Dw is input to the mobile terminal 1.

The mobile terminal 1 receiving the combination signal Dw receives the downlink signals DL1 to DLN included in the combination signal Dw and transmits an uplink signal UL including a reception acknowledgement message for the downlink signals DL1 to DLN.

From the reception acknowledgement message included in the uplink signals UL, throughputs TP1(i) to TPN(i) for the respective downlink signals DL1(i) to DLN(i) at the interference signal frequency Fif(i) are collectively measured (S24).

It is determined whether or not the measured throughputs TP1(i) to TPN(i) are equal to or greater than the defined value R (S25). If all the throughputs TP1 (i) to TPN(i) are equal to or greater than the defined value R, a pass determination result indicating that the out-of-band blocking performance for the interference signal frequency Fif(i) falls into a pass range is stored in a memory (not illustrated) (S26).

Figure 3:
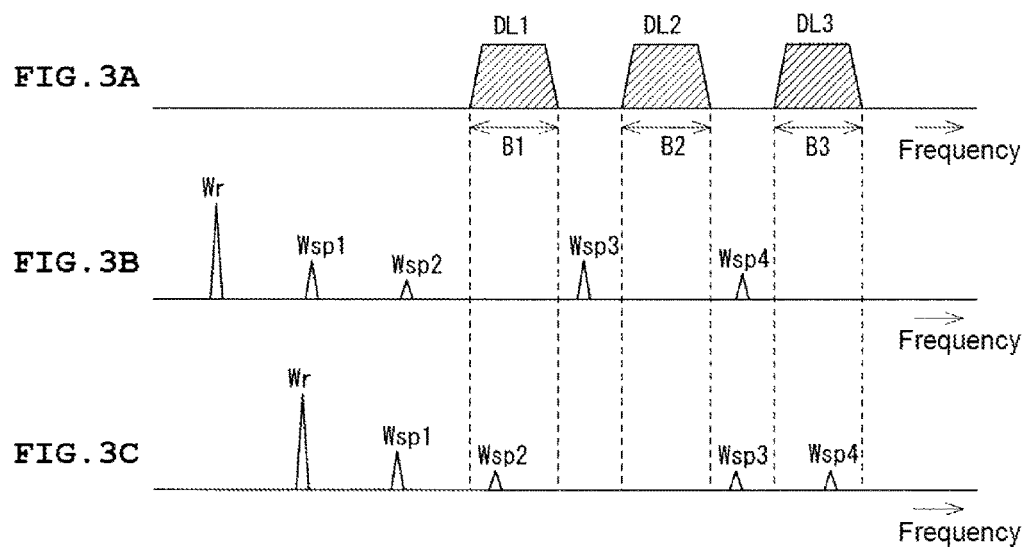
FIGS. 3A to 3C are diagrams illustrating an operation of the embodiment of the present invention.

Here, for example, in a state in which the frequency bands of the three downlink signals DL1 to DL 3 that are throughput measurement targets are set as B1 to B3 as illustrated in FIG. 3A, a state in which levels of spurious components Wsp1, Wsp2, . . . of the interference signal Wif of the fundamental wave component Wr are sufficiently lower than that of the downlink signal and do not fall into the frequency bands B1 to B3 as illustrated in FIG. 3B, or a state in which, even when there is the spurious component that falls into the frequency bands B1 to B3 among the spurious components Wsp1, Wsp2, . . . of the interference signal Wif, the level thereof is sufficiently lower than that of the downlink signal as illustrated in FIG. 3C, an influence of the spurious component on the throughput of the downlink signal is small, and if the out-of-band blocking performance of the mobile terminal 1 itself for the interference signal frequency Fif(i) satisfies the criterion, the measured throughput is highly likely to equal to or greater than the defined value R. That is, if all the throughputs are equal to or greater than the defined value R under an adverse condition in which there is no spurious component suppression using such a filter 23, the out-of-band blocking performance of the mobile terminal 1 at the interference signal frequency can be determined to satisfy the criterion.

Figure 4:
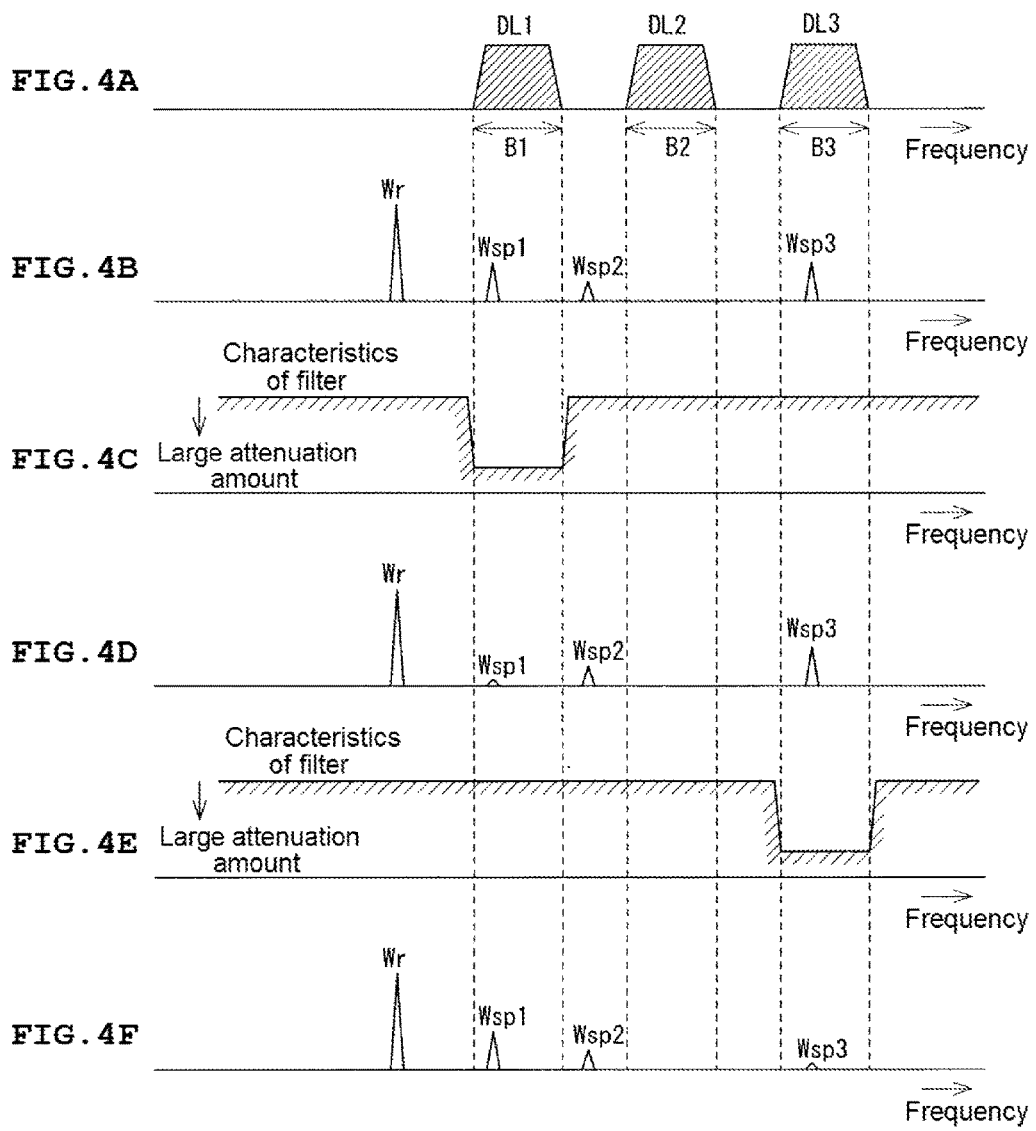
FIGS. 4A to 4F are diagrams illustrating an operation of the embodiment of the present invention.
Figure 5:
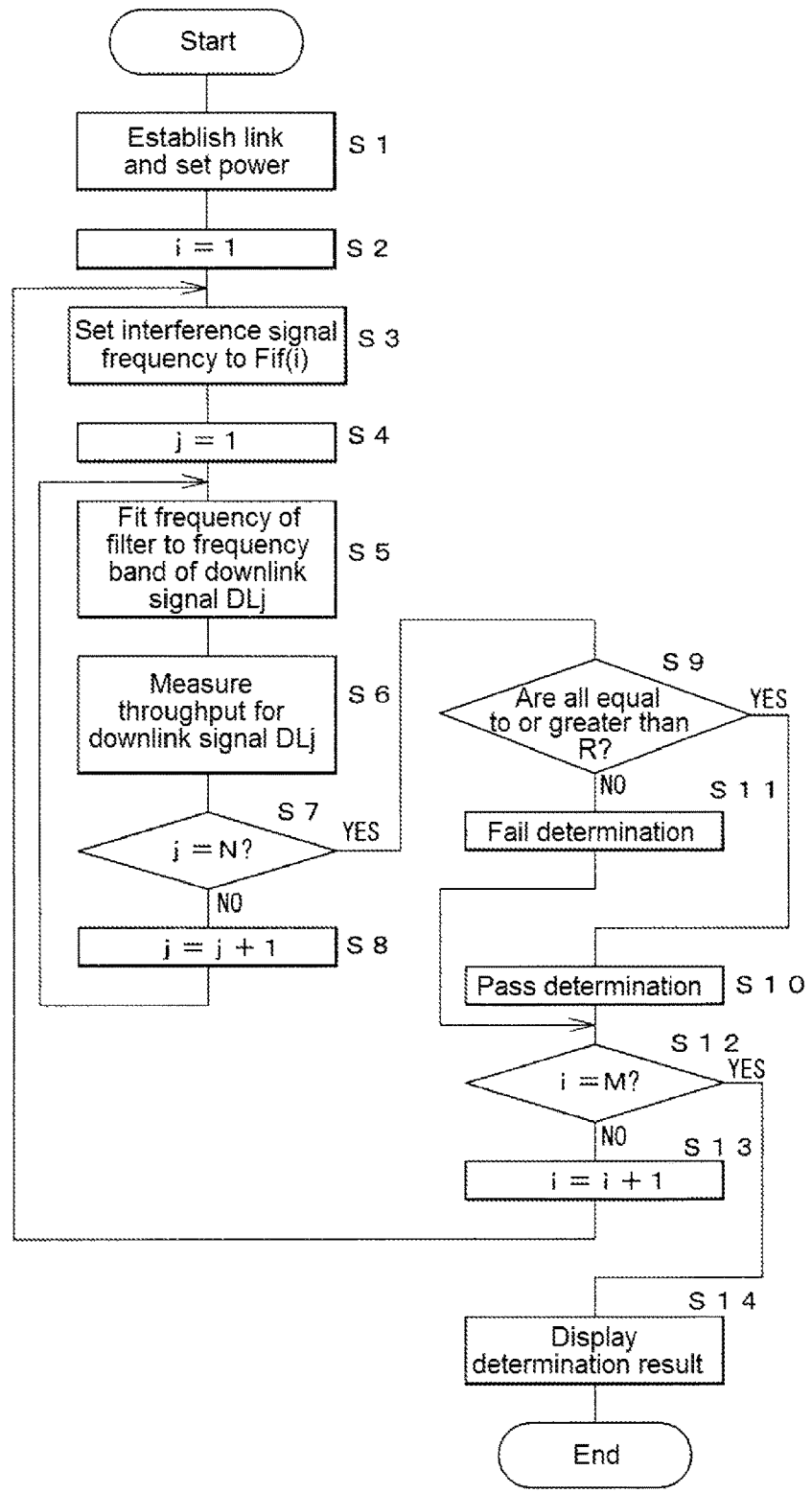
FIG. 5 is a flowchart illustrating a measurement procedure of a scheme of the related art.

Further, for example, for the frequency bands B1 to B3 of the three downlink signals DL1 to DL3 in FIG. 4A, if any (here, Wsp1 and Wsp3) of the spurious component Wsp1, Wsp2, . . . of the interference signal Wif fall into any (here, B1 and B3) of the frequency bands B1 to B3 with relatively high levels as illustrated in FIG. 4B, the throughputs for the downlink signals using the frequency bands are likely not to reach the defined value R.

In a case where any one of the collectively measured throughputs TP1(i) to TPN(i) is determined not to reach the defined value R, for example, the filter 23 is controlled so that the signal suppression band of the filter 23 overlaps one (here, B1) of the frequency bands (here, B1 and B3) of the downlink signals DLx (here, DL1 and DL3) corresponding to the throughputs TPx that do not reach the defined value R as illustrated in FIG. 4C, and the throughput for the downlink signal DLx is re-measured in a state in which a spurious component (here, Wsp) failing into the frequency band (here, B1) of the downlink signal DLx (here, DL1) is suppressed to a sufficient low level as illustrated in FIG. 4D (S27 and S28).

Further, in a case where there is another throughput TPx that does not reach the defined value R, the same filter control is performed on the other frequency band (here, B3) as illustrated in FIG. 4E, a process of performing throughput re-measurement is repeated in a state in which a spurious component (here, Wsp3) failing into the frequency band (here, B3) of the downlink signal DLx (here, DL3) is suppressed to a sufficient low level as illustrated in FIG. 4F, and a re-determination of whether or not the re-measured throughputs TPx1', TPx2', . . . are equal to or greater than the defined value R is performed after the re-measurement for all the throughputs TPx1, TPx2, . . . that do not reach the defined value R is completed (S29 and S30).

In a case where it is determined in the re-determination process (S30) that all the throughputs TPx1', TPx2', . . . are equal to or greater than the defined value R, a first throughput determination result is regarded as being caused by the spurious components included in the interference signal, and the procedure proceeds to the process S26 to store a pass determination result indicating that out-of-band blocking performance for the interference signal frequency Fif(i) falls into the pass range.

Further, in a case where it is determined in the re-determination process (S30) that any of the throughputs TPx1', TPx2', . . . does not reach the defined value R, a fail determination result indicating that out-of-band blocking performance for the interference signal frequency Fif(i) fails is stored in a memory (not illustrated) (S31).

Thus, if the pass and fail determination result of the out-of-band blocking performance for the interference signal frequency Fif(i) is stored, the variable i is increased by 1, and the procedure returns to the process S23 in which the frequency of the interference signal is changed into the next frequency Fif(i) and the same process is repeated. If a pass and fail determination result for the last interference signal frequency Fif(i) of i=M is obtained, a pass and fail determination result for all the interference signal frequencies or the like is displayed, and the measurement ends (S32 to S34).

As described above, since the test device 20 of the embodiment performs a process of suppressing a harmful spurious component included in the interference signal only on the downlink signal for which the throughput does not reach the defined value, the process can be realized with one frequency variable filter 23, and the configuration is simple and inexpensive.

Further, if there is a downlink signal for which the collectively measured throughputs do not satisfy the defined value R, re-measurement and re-determination of the throughput for the downlink signal are performed in a state in which a frequency component overlapping the frequency band of the downlink signal has been suppressed from the frequency component of the interference signal by the filter 23. If the re-measured throughput is equal to or greater than the defined value R, a result of the first throughput determination is caused by the spurious component included in the interference signal, and the out-of-band blocking performance of the mobile terminal itself is determined to satisfy the criterion. If the re-measured throughputs for all the downlink signals are equal to or greater than the defined value, the procedure proceeds to collective measurement in the next interference signal frequency.

Accordingly, if the out-of-band blocking performance of the mobile terminal 1 itself is assumed to satisfy a criterion for all the interference signal frequencies, frequencies (the number of times) at which, for example, the spurious component included in the interference signal falls into the frequency bands of three downlink signals (N=3) and the throughput is smaller than the defined value R in a total step number M of the interference signal frequency are $\alpha$, $\beta$, and $\gamma$, and a throughput measurement time (re-measurement time) for one downlink signal is Tb, the measurement can end with $$Ta \times M + Tb \times (\alpha + \beta + \gamma).$$

Here, a time required for switching of the interference signal frequency or a time required for switching of the signal suppression band of the filter 23 is neglected.

On the other hand, in a scheme of the related art in which an operation of measuring a throughput in a state in which a signal suppression bandwidth of a filter is fitted to one downlink signal in a case where one filter is used, fitting a signal suppression band of the filter to the next downlink signal, and then measuring the throughput is repeated, and the throughputs of all the interference signal frequencies are measured, a measurement time of Tb×M×N is required if the number of downlink signals is N.

If the time Ta required for the collective throughput measurement is substantially the same as a throughput measurement time Tb of one downlink signal, $((\alpha + \beta + \gamma) = M/10$, and N=3, a measurement time of the test device 20 of the embodiment of the present invention is, $$Ta \times M + Tb \times (\alpha + \beta + \gamma) = Tb \times M(1 + \tfrac{1}{10}),$$

and is much shorter than the measurement time Tb×M×3 in the scheme of the related art.

Even when the number of re-measurements $(\alpha + \beta + \gamma)$ due to a spurious component is every time, $\alpha + \beta + \gamma = M$, and the measurement time is fitted to Tb×M×2 and is $\tfrac{2}{3}$ of the measurement time Tb×M×3 in the scheme of the related art.

In the above description, in a case where any one of the throughput re-measurement results for the downlink signal does not satisfy the defined value R at any interference signal frequency, a fail determination result is stored and the procedure proceeds to measurement at the next interference signal frequency. However, in a case where any one of the throughput re-measurement results does not satisfy the defined value R, a measurement ending method or another process (for example, a process of decreasing an interference signal level and performing a re-measurement process) can be executed.

DESCRIPTION OF REFERENCE NUMERALS AND SIGNS

20: mobile terminal test device
21: transmission and reception unit
22: signal generator
23: filter
24: signal combination unit
30: test control unit
31: collective throughput measurement means
32: throughput determination means
33: throughput re-measurement means
34: throughput re-determination means
35: interference signal frequency switching means
40: operation unit
41: display unit

What is claimed is:

1. A mobile terminal test device, comprising:
a transceiver that simultaneously outputs a plurality of downlink signals, each in a different one of a plurality of frequency bands, for being applied to a mobile terminal of a test target corresponding to a carrier aggregation scheme, and receives an uplink signal output from the mobile terminal;
a signal generator configured to output an interference signal in predetermined frequency intervals over a predetermined frequency range, the interference signal being a continuous wave (CW) used in measurement of out-of-band blocking performance;
a frequency variable filter that receives the interference signal output from the signal generator, that suppresses a frequency component of the interference signal other than a fundamental frequency component of the interference signal, the suppressed frequency component overlapping a designated frequency band among the plurality of frequency bands of the downlink signal output from the transceiver, and that outputs a resultant interference signal; and
a computer configured to:
combine the interference signal output from the frequency variable filter with the plurality of downlink signals output from the transceiver and apply a combination signal to the mobile terminal, the mobile terminal test device measuring the throughputs for respective interference signal frequencies for the plurality of downlink signals of the mobile terminal receiving the combination signal;
measure the throughputs for respective interference signal frequencies for the plurality of downlink signals of the mobile terminal receiving the combination signal, collectively with respect to the plurality of downlink signals;
determine whether or not the measured throughput for each interference signal frequency is equal to or greater than the defined value;
designate a signal suppression band of the frequency variable filter, the designated signal suppression band overlapping the frequency band of a downlink signal determined not to reach the defined value, and perform re-measurement of the throughput for the downlink signal;

determine whether or not the re-measured throughput is equal to or greater than the defined value; and determine that out-of-band blocking performance of all the downlink signals at the interference signal frequency satisfies a criterion in a case where the measured throughputs at a certain interference signal frequency are determined to be equal to or greater than the defined value or a case where the re-measured throughputs of all the downlink signals are determined to be equal to or greater than the defined value, and switch the frequency of the interference signal output from the signal generator to a next of the predetermined frequency intervals in the predetermined frequency range.

2. The mobile terminal test device according to claim 1, wherein the computer is further configured to measure the throughputs by monitoring a reception acknowledgement message included in the uplink signal received and demodulated in the transceiver and counting the reception acknowledgement message for each downlink signal.

3. A mobile terminal test method of combining a plurality of downlink signals, each in a different one of a plurality of different frequency bands, with an interference signal of a continuous wave (CW) of which a frequency is variable in a predetermined frequency interval over a predetermined frequency range required for measurement of out-of-band blocking performance, applying a combination signal to a mobile terminal that is a test target corresponding to a carrier aggregation scheme, and measuring the throughputs for respective interference signal frequencies for the plurality of downlink signals of the mobile terminal receiving the combination signal, the method comprising:

a collective throughput measurement step of measuring the throughputs for respective interference signal frequencies for the plurality of downlink signals of the mobile terminal receiving the combination signal, collectively with respect to the plurality of downlink signals;

a throughput determination step of determining whether or not the throughput for each interference signal frequency measured in the collective throughput measurement step is equal to or greater than the defined value;

a throughput re-measurement step of performing re-measurement of the throughput for the downlink signal where a frequency component of the interference signal that is suppressed by a filter overlaps a frequency band of a downlink signal determined not to reach the defined value in the throughput determination step;

a throughput re-determination step of determining whether or not the throughput re-measured in the throughput re-measurement step is equal to or greater than the defined value; and an interference signal frequency switching step of determining that out-of-band blocking performance of all the downlink signals at the interference signal frequency satisfies a criterion in a case where it is determined in the throughput determination step that the throughputs collectively measured at a certain interference signal frequency are equal to or greater than the defined value or a case where it is determined in the throughput re-determination step that the throughputs of all the downlink signals re-measured in the throughput re-measurement step are equal to or greater than the defined value, and switching the frequency of the interference signal to a next of the predetermined frequency intervals in the predetermined frequency range.

4. The mobile terminal test method according to claim 3, wherein the collective throughput measurement step includes measuring the throughputs by monitoring a reception acknowledgement message included in a signal obtained by receiving and demodulating an uplink signal output from the mobile terminal and counting the reception acknowledgement message for each downlink signal.

* * * * *